United States Patent [19]
Booth et al.

[11] Patent Number: 5,738,427
[45] Date of Patent: Apr. 14, 1998

[54] PROJECTOR COOLING SYSTEM

[75] Inventors: David K. Booth, Tigard; Arlie R. Conner, Tualatin, both of Oreg.

[73] Assignee: Lightware, Inc., Beaverton, Oreg.

[21] Appl. No.: 839,686

[22] Filed: Apr. 14, 1997

Related U.S. Application Data

[63] Continuation of Ser. No. 541,325, Oct. 10, 1995, Pat. No. 5,628,553.

[51] Int. Cl.$^6$ ................................. G03B 21/16
[52] U.S. Cl. ................................. 353/57; 353/60
[58] Field of Search ................. 353/52, 57, 60, 353/61, 100, 101, 119; 362/285, 287, 288, 294, 306; 349/5, 161

[56] References Cited

U.S. PATENT DOCUMENTS

| | | | |
|---|---|---|---|
| 2,033,619 | 3/1936 | Foster et al. | 353/102 |
| 2,818,771 | 1/1958 | Armbruster | 353/61 |
| 3,250,175 | 5/1966 | Braun | 353/61 |
| 4,023,893 | 5/1977 | Herbert et al. | 353/102 |
| 4,943,156 | 7/1990 | Vanderwetf | 353/DIG. 4 |
| 5,287,132 | 2/1994 | Suzuki et al. | 353/57 |
| 5,400,094 | 3/1995 | Eckhardt | 323/102 |

*Primary Examiner*—William Dowling
*Attorney, Agent, or Firm*—Hancock Meininger & Porter LLP

[57] ABSTRACT

The present invention includes a projector illumination system having a light source positioned between a condenser lens and a light-collecting reflector. The light source includes a bulb that is urged under compression against a surface of the condenser lens. The condenser lens receives a flow of cooling air over a surface opposite that against which the light source is in contact to minimize deformation of the condenser lens caused by heat emanating from the light source.

21 Claims, 5 Drawing Sheets

PROJECTOR COOLING SYSTEM

This is a continuation of application Ser. No. 08/541,325, filed Oct. 10, 1995, now U.S. Pat. No. 5,628,553.

FIELD OF THE INVENTION

The present invention relates to image display projectors such as liquid crystal display projectors and, in particular, to an illumination system for use in such projectors.

BACKGROUND OF THE INVENTION

Image display projectors generate display images and project them onto display screens, typically for viewing by multiple persons or viewers. The display images are formed and projected typically by passing light from a high-intensity light source through an image-forming medium such as a translucent film or liquid crystal display (LCD).

FIG. 1 is a diagrammatic side view diagram of a conventional prior art illumination system 10 for a liquid crystal display (LCD) projector. Illumination system 10 includes a light source 12, such as a high-intensity tungsten-halogen quartz lamp, that is positioned in spaced apart relation between a light-collecting reflector 14 and a condenser lens 16.

Reflector 14 and condenser lens 16 cooperate to collect the light generated by light source 12 for use by the projector.

Light source 12 is spaced-apart from condenser lens 16 by a distance 18 of between 4 and 12 mm. Spacing 18 is selected according to at least two conflicting design constraints. Light source 12 preferably is positioned as close as possible to condenser lens 16 to maximize the amount of light condenser lens 16 receives from light source 12 through collection angel X. Conversely, spacing 18 preferably is maximized to reduce the amount of heat transferred from light source 12 to condenser lens 16.

The conventional 400 watt tungsten-halogen quartz lamp used in a liquid crystal display projectors has a bulb surface temperature of up to about 700° C. Heat from light source 12 typically is considered to cause heat gradients within condenser lens 16. The heat gradients cause regions of condenser lens 16 to expand differentially relative to other regions, thereby introducing stress changes that can cause breakage in condenser lens 16. Increasing the spacing between light source 12 and condenser lens 16 reduces the heat gradients.

Some projectors use "arc" forms of lamps such as metal halide and xenon lamps. These lamps provide a special case of heating gradient problems in condenser systems. Arc lamps have overall small physical sizes and relatively small, intense sources with relatively high ultraviolet (DV) light outputs. The glass types commonly used in condenser lenses generally absorb UV light. As a consequence, most condenser lenses used with arc lamps overheat in a small area where the light flux is concentrated. Since the small physical size promotes close spacing the small sources create high localized flux, the overheating caused by UV light absorption can cause breakage of condenser lenses.

Increasing the spacing between light source 12 and condenser lens 16 passively reduces the temperatures within condenser lens 16. Conventional projectors also actively cool condenser lens 16 by directing an airflow 20 with a fan 22 transversely across light source 12, its base, and condenser lens 16. The airflow is transverse relative the optic axis 20 of the projector.

However, tungsten halogen and metal halide lamps require high envelope or bulb temperature in order to maximize service life. Conventional active cooling of condenser lens 16 can over-cool the envelope and shorten the service life of such lamps. Accordingly, the cooling of condenser lens 16 conflicts with maintaining a high bulb temperature, and typically results in less than optimal temperature conditions for both light source 12 and condenser lens 16.

Another consequence of the conventional spacing between light source 12 and condenser lens 16 is that the spacing allows light generated by light source 12 to escape condenser lens 16 and not be usable for projecting display images. The collection angle α decreases with increases in distance 18. This lost light reduces the brightness of the LCD projector.

A further consequence of the conventional spacing between light source 12 and condenser lens 16 is that relatively small movements or accelerations of the LCD projector, such as occur when it is moved or transported, can cause light source 12 to move relative to condenser lens 16. Such movement of light source 12 can cause light it generates to be misdirected and unusable for projecting display images.

SUMMARY OF THE INVENTION

An object of the present invention is, therefore, to provide a projector illumination system with improved light collection efficiency.

Another object of this invention is to provide such an illumination system with improved optical alignment.

A further object of this invention is to provide an illumination system with effective cooling.

Yet another object of this invention is to provide an illumination system that is mechanically rugged.

The present invention includes a projector illumination system having a light source positioned between a condenser lens and a light-collecting reflector. The light source includes a bulb that is urged under compression against a light bulb mechanical stop. In a first preferred embodiment, the mechanical stop is the surface of the condenser lens. In a second preferred embodiment, the mechanical stop is a wire or knife-edge positioned between the bulb and the surface of the condenser lens. The reflector cooperates with the designed position and orientation of the light source to provide consistent illumination of the condenser lens.

According to its normal operation, the light source bulb imparts heat upon the condenser lens. The condenser lens receives a generally axial flow of cooling air over a surface opposite the surface against which the light source is in contact. The heat is conducted through the condenser lens to its largest outer surface. The cooling air flow removes the heat symmetrically from the large, axially outer surface of the condenser lens and thereby minimizes heat-induced deformation of it. In addition, the cooling air flow is directed away from the light source bulb to maintain its high optimal operating temperature and prolong its operational life.

An illumination system of the present invention maximizes illumination efficiency and minimizes illumination source size by positioning the light source and reflector as close as possible to condenser lens. The compressive contact between the light source bulb and its mechanical stop minimizes movement between the light source and the light collection optical components. As a result, their optical alignment is maintained and damaging impact between the lamp and the condenser lens is reduced substantially.

The cooling air flow over the opposed surface of the condenser lens uniformly cools it and minimizes the temperatures within the condenser lens caused by heat applied by the light source. In contrast, the transverse airflow used in conventional projectors provides decreasing cooling along the airflow path. As a consequence, conventional transverse active cooling introduces transverse heat or temperature gradients in the condenser lens. Moreover, such cooling generally cools parts of the lamp envelope excessively.

The foregoing and other features and advantages of preferred embodiments of the present invention will be more readily apparent from the following detailed description, which proceeds with reference to the accompanying drawings.

DETAILED DESCRIPTION OF PREFERRED EMBODIMENTS

Figure 2:
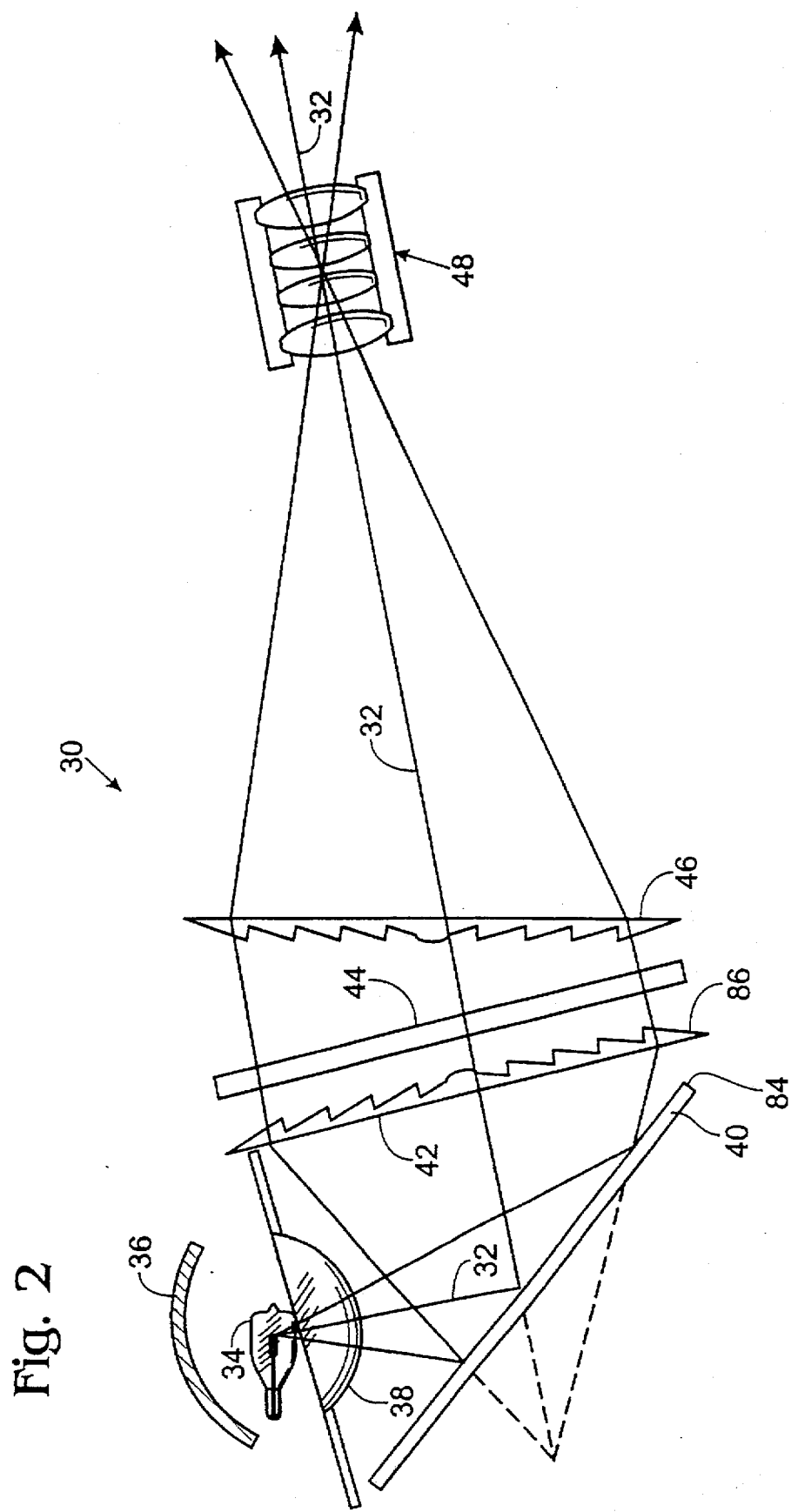
FIG. 2 is a diagrammatic side view of an LCD projector employing a projector illumination system of the present invention.

FIG. 2 is a schematic side view optical diagram of a LCD projector 30 of the present invention oriented and configured to project display images along a central optic axis 32 upward toward a display screen (not shown). LCD projector 30 includes an illumination or light source 34 and a light-collecting reflector 36 that direct polychromatic, substantially white light through a condenser lens 38 toward a fold mirror 40.

The light passes through a collimating lens 42 (e.g., of the Fresnel type) that collimates the light for delivery to an image source 44. Image source 44 preferably is a transmissive color thin-film transistor (TFT) active matrix LCD of the type available from Sharp Corporation of Osaka, Japan, together with any required polarizing elements. Alternatively, image source 44 could be any other type of suitable transmissive LCD.

As is known in the art, image source 44 controls or modulates the substantially white light to form a multi- or full-color display object according to a video display signal delivered to image source 44 from display control circuitry (not shown). The video display signal may be in the form of, for example, a computer display signal that is generated in real-time or retrieved from a computer memory or a television signal obtained from a broadcast or a video recording medium. The light of the display object propagates to a converging lens 46 that focuses the light toward a conventional objective projection lens assembly 48, which preferably is in the form of a varifocal lens assembly.

Figure 3:
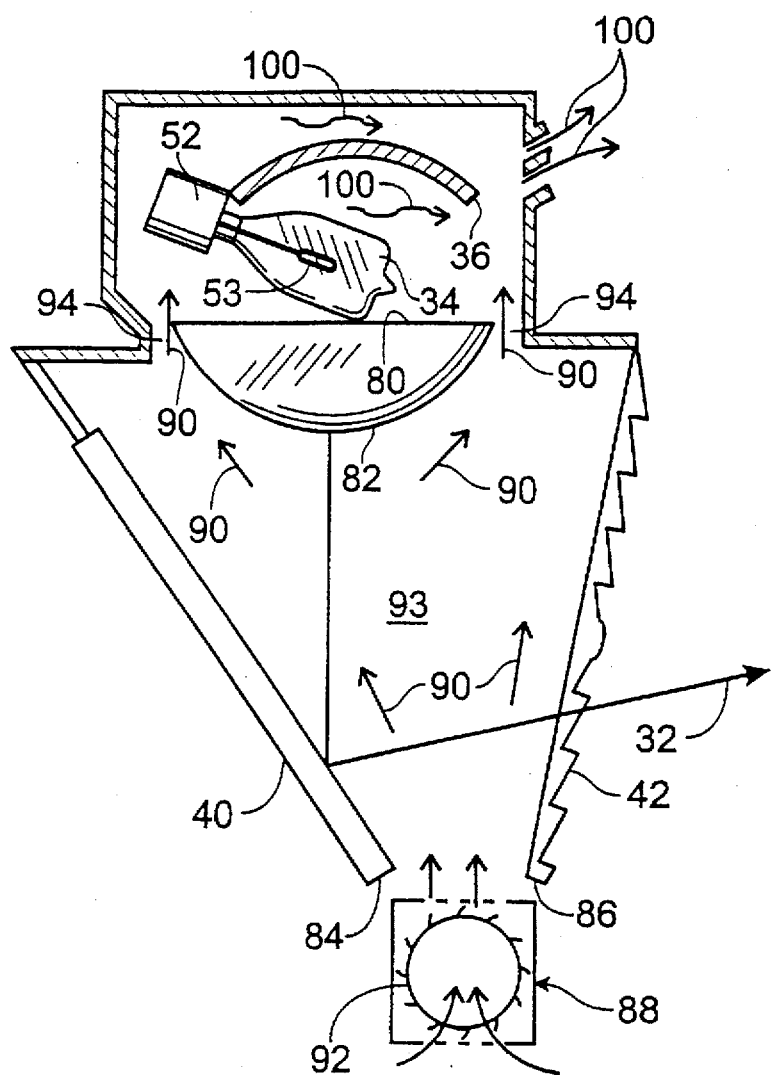
FIG. 3 is a diagrammatic side view of a first preferred embodiment of the projector illumination system of the present invention.

FIG. 3 shows a preferred projector illumination system 50 of this invention with light-collecting reflector 36 facing condenser lens 38, illumination source 34 positioned between light-collecting reflector 36 and condenser lens 38, and an illumination source support 52 that supports illumination source 34 under compression against a mechanical stop such as condenser lens 38.

Illumination source 34 preferably is a tungsten-halogen lamp with an internal filament 53 and a high power rating of between 200 and 700 watts. Reflector 36 preferably is a conventional spherical optical reflector.

Figure 4A:
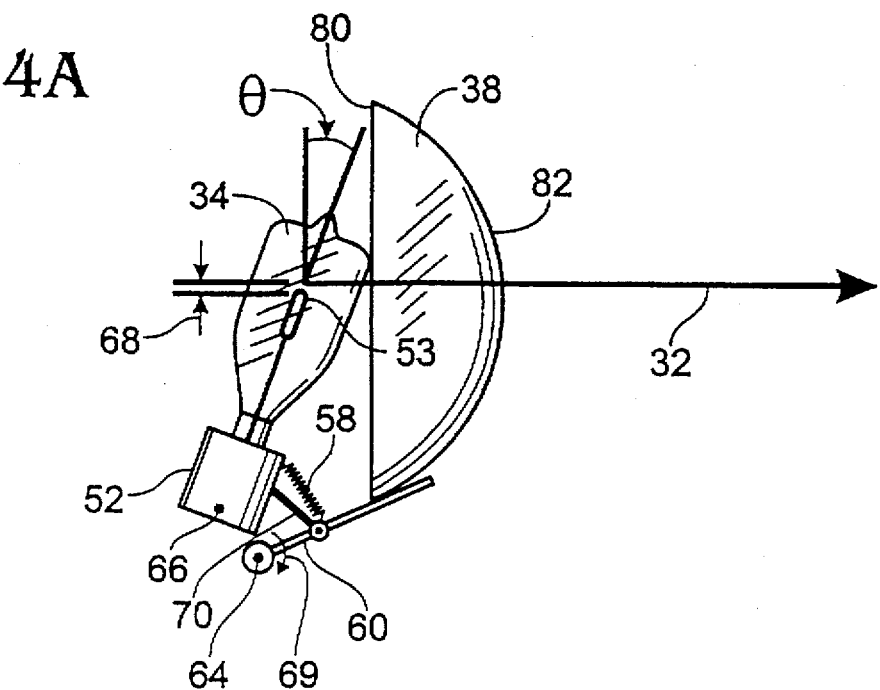
FIGS. 4A and 4B show respective first and second embodiments of illumination source supports for positioning an illumination source bulb against a condenser lens.

Referring to FIG. 4A, illumination source 34 includes a conventional electrode arrangement (not shown) positioned adjacent one end of illumination source 34 for receiving illumination power (i.e., electrical current). Illumination source support 52 includes an illumination source socket that supports one end of illumination source 34 and couples the electrode arrangement to a current source (not shown).

Illumination source support 52 also includes a resilient bias member 58 that urges illumination source 34 under compression against condenser lens 38.

Resilient bias member 58 preferably urges illumination source 34 under compression against condenser lens 38. In a preferred embodiment, resilient bias member 58 is a coil or other type of metal spring, an elastic band, or a sheet metal spring, that is carried between illumination source and a pivotable locking arm 60.

Figure 1:
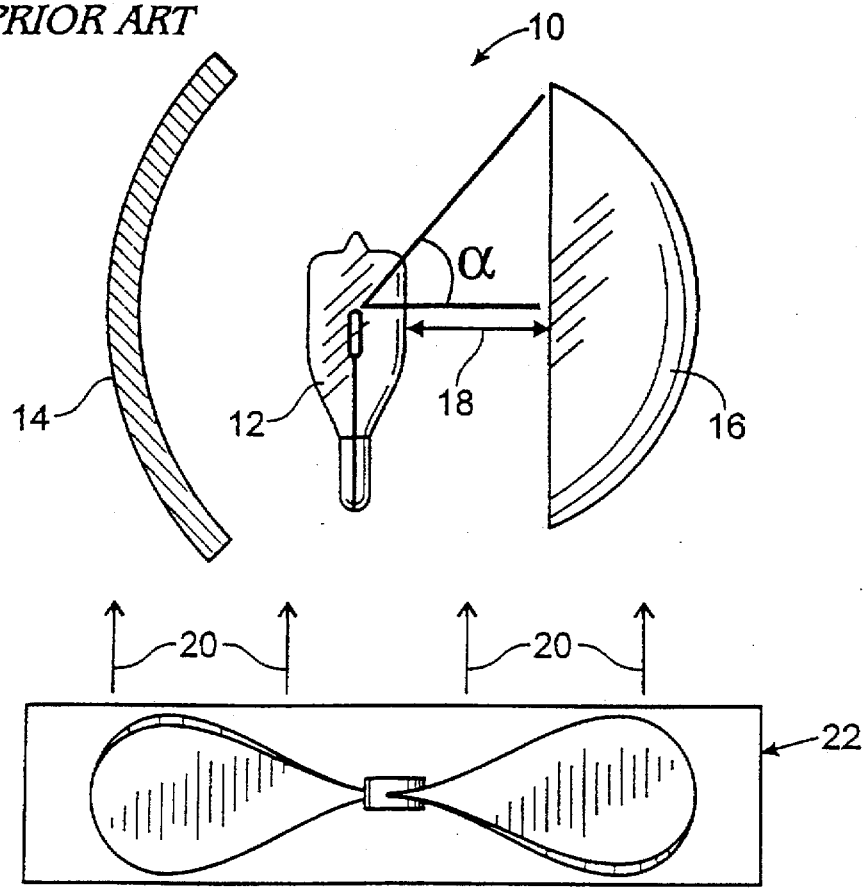
FIG. 1 is a diagrammatic side view of a conventional prior art projector illumination system.

Locking arm 60 cooperates with resilient bias member 58 to place illumination source 34 gently against condenser lens 38 before compression is applied between them. In particular, locking arm 60 and illumination source support 52 are pivotable about respective parallel pins 64 and 66 to move illumination source 34 between an engaged position (shown) and a disengaged position similar to that of light source 12 in FIG. 1.

In the disengaged position, a user can remove illumination source 34 from and insert replacements into source support 52. In the engaged position, illumination source 34 is tilted at an angle of between 5 and 15 degrees, and preferably at an angle of about 10 degrees relative to a perpendicular from central optic axis 32. Filament 53 is offset from central optic axis 32 by a distance 68 of about 0.5 mm. The offset of filament 53 prevents it from shadowing the light reflected along axis 32 by reflector 36.

Whenever illumination source 34 is in the disengaged position, locking arm 60 can be pivoted manually by a user in a first direction 69 about axis 64. Resilient bias member 54 between illumination source support 52 and locking arm 60 allows the user to engage gently illumination source 34 with condenser lens 38. Additional pivotable movement of locking arm 60 to a locked position causes resilient bias member 58 to apply compression between illumination source 34 and condenser lens 38. With a rigid coupling arm 70 extending between locking arm 60 and support 52, manual pivoting of locking arm 60 opposite first direction 69 moves illumination source 34 to the disengaged position.

Figure 4B:
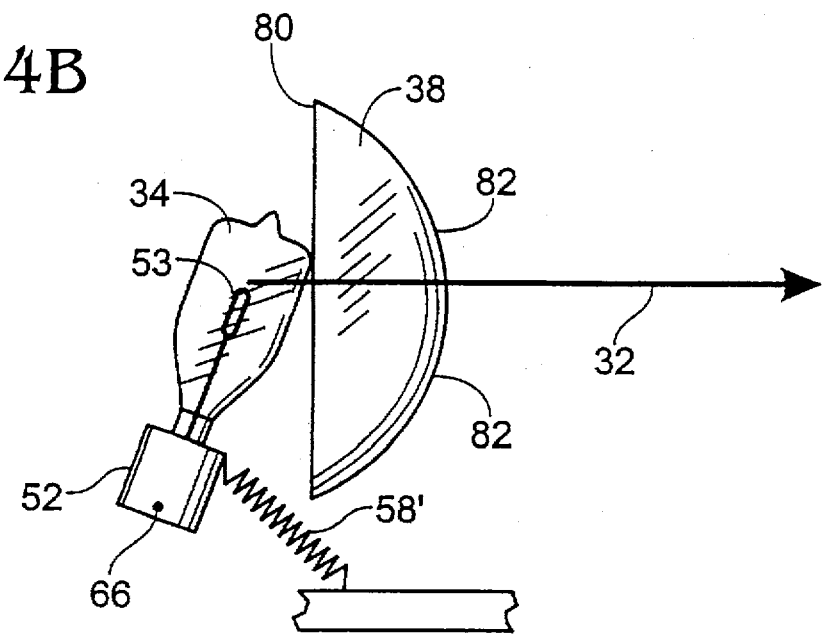

In an alternative embodiment shown in FIG. 4B, locking arm 60 is replaced by a resilient bias member 58' that constantly urges illumination source socket 54 toward condenser lens 38. Although simpler than the preferred embodiment, this alternative embodiment suffers from the disadvantage of illumination source 34 possibly striking condenser lens 38 and shattering if abruptly released from the disengaged position.

Illumination source 34 engages a receiving surface 80 of condenser lens 38, and an opposed exiting surface 82 of condenser lens 38 faces fold mirror 40. Fold mirror 40 has an edge 84 adjacent and spaced apart from an edge 86 of collimating lens 42. A cooling system 88 directs a generally axial flow of cooling air 90 over exiting surface 82 of condenser lens 38. Preferably, cooling system 88 includes a fan 92 that directs cooling air 90 over exiting surface 82 and out vents 94 positioned near the periphery of condenser lens 38.

Figure 5:
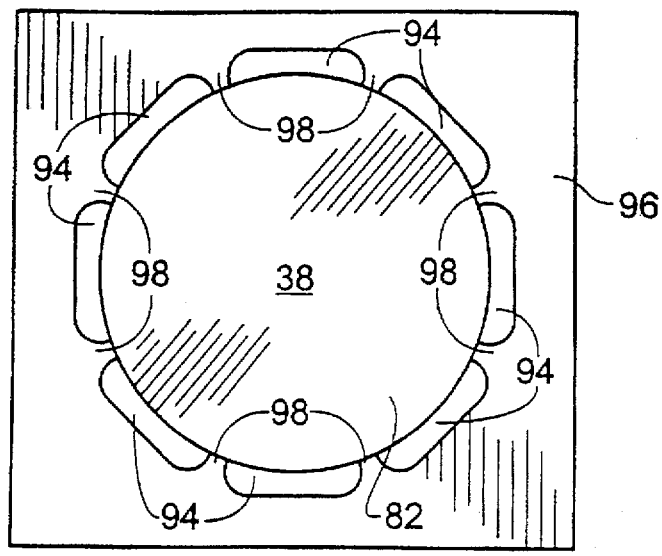
FIG. 5 is a simplified end view of a condenser lens viewed toward illumination source showing peripheral vents for providing uniform cooling of a condenser lens.

FIG. 5 is an end view of surface 82 of condenser lens 38 showing an array of vents 94 positioned peripherally about condenser lens 38. Preferably, vents 94 are formed in a sheet metal base 96 separated by fingers 98 against which surface 82 of condenser lens 38 is mounted.

Cooling system 88 provides a generally axial flow of cooling air 90 over exit surface 82 of condenser lens 38 to uniformly cool it. Cooling air 90 minimizes the temperatures within condenser lens 38 to well below the glass deformation temperatures. This protects condenser lens 38 from a loss of "temper" that results from excessive heat and which can cause condenser lens 38 to break.

The positioning of condenser lens 38, fold mirror 40 and image source 44 forms a generally closed, pressurized plenum 93 that directs cooling air 90 from fan 92 over condenser lens 38. Vents 94 are positioned so that the cooling air flows over exiting surface 82 without reaching illumination source 34, except for a low-speed flow of exhaust air 100.

Figure 6:
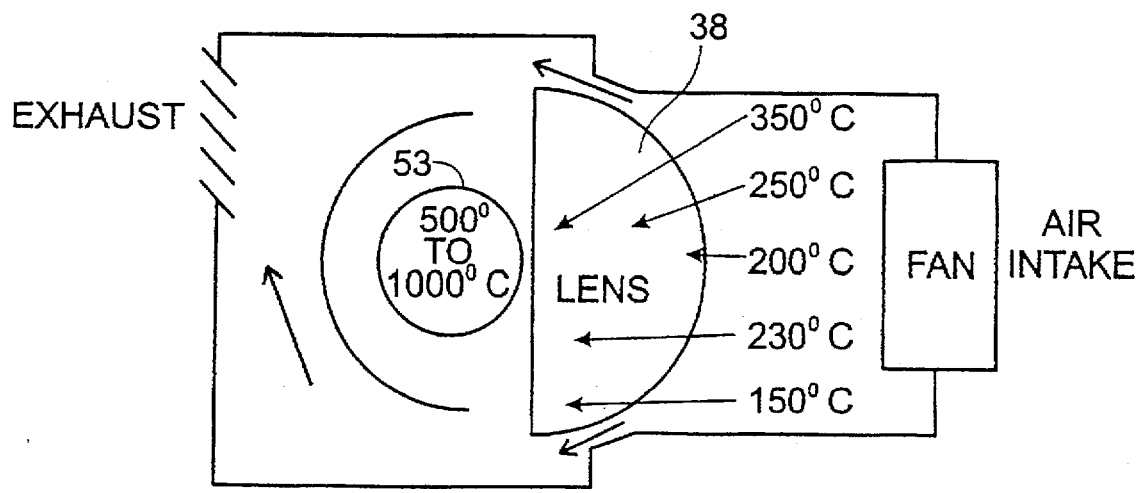
FIG. 6 is a diagrammatic mapping of temperatures within a condenser lens cooled according to this invention.

FIG. 6 diagrammatically maps temperatures determined to be within condenser lens 38 formed of B270 type glass. Also shown is the approximate temperature of filament 53 in illumination source 34. As shown in FIG. 6, the temperatures within condenser lens 38 are well below the glass transition temperature of 530° for B270 type glass.

Condenser lens 38 preferably is formed of tempered glass such as glass types B270 or F2 available from Schott of Germany. These glass types are characterized by relatively high indices of refraction (1.523 for B270 and 1.62 for F2), reasonable thermal coefficients of expansion (9.5×10-6/C for B270 and 9.2×10-6/C for F2), and their moldability in production.

With their indices of refraction being greater than 1.5, glass types B270 and F2 are considered "high index" types of glass that are capable of providing condenser lens 38 with increased optical power.

Such high index types of glass in condenser lens 38, in combination with the generally axial flow of cooling air 90, are capable of operation with an incandescent illumination source 34 operated in a high power mode (i.e., at least 500 watts). As a result, the benefit of increased optical power in condenser lens 38 of a high index glass may be combined with a high brightness, low-cost illumination source 34.

In contrast to such a combination of high performance, low-cost components, U.S. Pat. No. 5,400,094 of Eckhardt states that only lower wattage incandescent lamps can be used with tempered soda-lime glass condensers. The Eckhardt patent states that higher wattage lamps require the use of a glass with high resistance to thermal stress, such as borosilicate glasses, of which Pyrex brand glass is common. Although it has a low thermal coefficient of expansion of 3.5×10-6/C, Pyrex brand borosilicate glass has a low index of refraction of between about 1.46 and 1.49.

An additional benefit of this invention is that cooling air is not applied directly to illumination source 34. Tungsten-halogen or metal halide lamps can suffer undesirable aging effects when cooled too quickly by direct application of cooling air.

Figure 7:
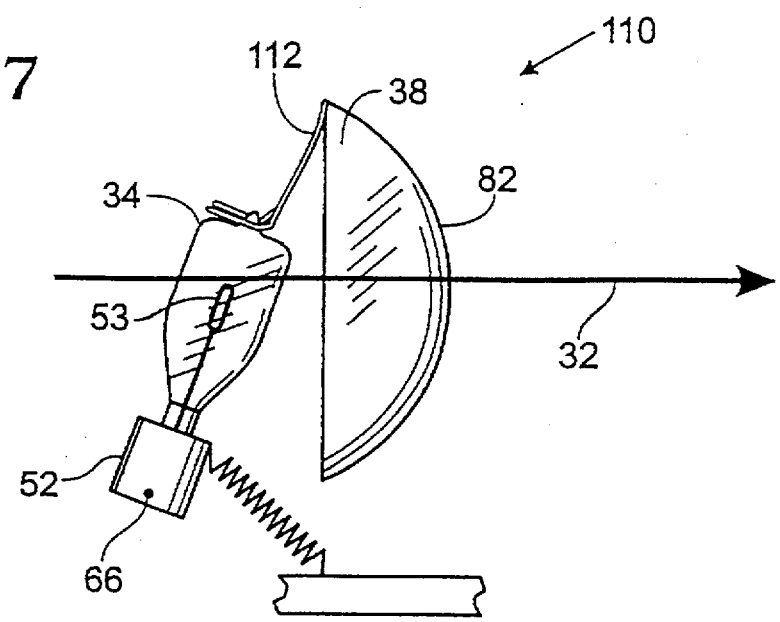
FIG. 7 is a diagrammatic partial side view of an alternative illumination system.

FIG. 7 is a diagrammatic partial side view of an alternative illumination system 110 having a mechanical stop 112 distinct from condenser lens 38 and against which illumination source 34 is supported under compression. Except as indicated, illumination system 110 is the same as illumination system 50 of FIG. 3.

Mechanical stop 112 may be or include a bent wire spring (as shown) or a solid knife-edge (oriented to minimize the shadowing of illumination source 34) positioned between illumination source 34 and condenser lens 38. Mechanical stop 112 allows illumination system 110 to accommodate illumination sources 34 with bulbs or envelopes having a variety of diameters.

More specifically, illumination source 34 having bulbs with diameters of about 18 mm typically would engage condenser lens 38, whereas illumination sources 34 having bulbs with diameters of about 14 mm typically would engage mechanical stop 112 under only slight compression. The compressive engagement between a smaller diameter illumination source 34 and mechanical stop 112 functions to minimize uncontrolled movement and potential breakage of the illumination source.

Having illustrated and described the principles of the present invention in a preferred embodiment, it should be apparent to those skilled in the art that the embodiment can be modified in arrangement and detail without departing from such principles. For example, the preferred embodiments have been described with reference to LCD projectors. However, the illumination system of this invention is similarly suitable for other types of image display projectors, including motion picture projectors. Accordingly, we claim as our invention all such embodiments as come within the scope and spirit of the following claims and equivalents thereto.

We claim:

1. In a display projector having a condenser lens that receives light from an illumination source and directs the light along an optic axis toward an image source to form a projection display image, the condenser lens including first and second generally opposed surfaces and the light from the illumination source passing along the optic axis into the first surface and out the second surface, the improvement comprising:

a cooling system for directing an axial flow of cooling air generally along the optic axis over the second surface of the condenser lens.

2. The projector of claim 1 in which the illumination source includes an envelope surface through which illumination passes toward the condenser lens and the projector further comprises an illumination source support that supports the illumination source with its envelope surface under compression against a mechanical stop.

3. The projector of claim 2 in which the mechanical stop includes the condenser lens.

4. The projector of claim 1 in which the cooling system includes a cooling air fan positioned in generally opposed relation to the second surface of the condenser lens.

5. The projector of claim 1 in which the cooling system includes plural vents positioned generally about the periphery of the condenser lens.

6. The projector of claim 1 in which the cooling system includes plural surfaces arranged to form a generally enclosed plenum that receives the cooling air and directs it generally along the optic axis over the second surface of the condenser lens.

7. The projector of claim 6 in which one of the surfaces arranged to form the plenum includes the second surface of the condenser lens.

8. The projector of claim 6 in which the image source includes plural generally flat optical components and one of the surfaces arranged to form the plenum includes one of the generally flat optical components of the image source.

9. The projector of claim 6 further comprising a fold mirror along the optic axis between the condenser lens and the image source and one of the surfaces arranged to form the plenum includes the fold mirror.

10. The projector of claim 6 in which the image source includes plural generally flat optical components and a fold mirror along the optic axis between the condenser lens and the plural generally flat optical components and the surfaces arranged to form the plenum include one of the generally flat optical components of the image source, the fold mirror, and the second surface of the condenser lens.

11. In a display projector having a condenser lens that receives light from an illumination source and directs the light along an optic axis toward an image source to form a projection display image, the condenser lens including first and second generally opposed surfaces and the light from the illumination source passing along the optic axis into the first surface and out the second surface, a method of cooling the condenser lens, comprising:

directing an axial flow of cooling air generally along the optic axis over the second surface of the condenser lens.

12. The method of claim 11 in which directing the axial flow of cooling air generally along the optic axis over the second surface of the condenser lens includes venting the cooling air generally about the periphery of the condenser lens.

13. The method of claim 11 in which directing the axial flow of cooling air generally along the optic axis over the second surface of the condenser lens includes directing the cooling air into a generally enclosed plenum formed in part by the second surface of the condenser lens.

14. The method of claim 11 in which directing the axial flow of cooling air generally along the optic axis over the second surface of the condenser lens includes fanning the cooling air from a position in generally opposed relation to the second surface of the condenser lens.

15. In a display projector having a condenser lens that receives light from an illumination source and directs the light along an optic axis toward an image source to form a projection display image, the condenser lens including first and second generally opposed surfaces and the light from the illumination source passing along the optic axis into the first surface and out the second surface, the improvement comprising:

a generally enclosed plenum that receives cooling air and directs it generally over the second surface and through vents positioned about the periphery of the condenser lens.

16. The projector of claim 15 further comprising a cooling air fan positioned in generally opposed relation to the second surface of the condenser lens.

17. The projector of claim 15 in which plural surfaces are arranged to form the plenum and one of the surfaces arranged to form the plenum includes the second surface of the condenser lens.

18. The projector of claim 17 in which the image source includes plural generally flat optical components and one of the surfaces arranged to form the plenum includes one of the generally flat optical components of the image source.

19. The projector of claim 17 further comprising a fold mirror along the optic axis between the condenser lens and the image source and one of the surfaces arranged to form the plenum includes the fold mirror.

20. The projector of claim 17 in which the image source includes plural generally flat optical components and a fold mirror along the optic axis between the condenser lens and the plural generally flat optical components and the surfaces arranged to form the plenum include one of the generally flat optical Components of the image source and the fold mirror.

21. The projector of claim 15 in which the illumination source includes an envelope surface through which illumination passes toward the condenser lens and the projector further includes an illumination source support that supports the illumination source with its envelope surface against the first surface of the condenser lens.

* * * * *